United States Patent
Page et al.

(10) Patent No.: US 7,592,583 B2
(45) Date of Patent: Sep. 22, 2009

(54) PHOTOSENSOR WITH CUSTOMIZABLE ANGULAR-RESPONSE CHARACTERISTICS

(75) Inventors: Erik Page, Winters, CA (US); Keith Graeber, Davis, CA (US); Konstantinos Papamichael, Davis, CA (US); Michael Siminovitch, Woodland, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 12/027,866

(22) Filed: Feb. 7, 2008

(65) Prior Publication Data

US 2008/0185507 A1  Aug. 7, 2008

Related U.S. Application Data (60) Provisional application No. 60/900,080, filed on Feb. 7, 2007.

(51) Int. Cl.
*H01J 5/16* (2006.01)
*H01J 40/14* (2006.01)
*G01J 1/32* (2006.01)
*F21V 9/02* (2006.01)

(52) U.S. Cl. .................. 250/216; 250/205; 250/206; 362/2

(58) Field of Classification Search .............. 250/216, 250/237 R, 227.29, 227.3, 215, 226, 239, 250/203.2, 221; 356/416; 362/611–622
See application file for complete search history.

(56) References Cited

U.S. PATENT DOCUMENTS

| 3,880,528 | A | * | 4/1975 | Petersen et al. | ............. 356/225 |
| 4,907,139 | A | * | 3/1990 | Quiogue | ..................... 362/153 |
| 5,416,318 | A | * | 5/1995 | Hegyi | ......................... 250/226 |
| 6,246,045 | B1 | * | 6/2001 | Morris et al. | ............... 250/216 |
| 6,943,342 | B2 | * | 9/2005 | Bechtel et al. | ............. 250/239 |
| 7,088,397 | B1 | * | 8/2006 | Hunter et al. | ............... 348/374 |
| 7,190,126 | B1 | | 3/2007 | Paton | |
| 2004/0251435 | A1 | * | 12/2004 | Sawayama et al. | ..... 250/559.16 |
| 2007/0120653 | A1 | | 5/2007 | Paton | |

OTHER PUBLICATIONS

Wattstopper, LightSaver LS-101 Daylighting Controller, http://www.wattstopper.com/products/details.html?id=180, downloaded Feb. 13, 2008.

* cited by examiner

*Primary Examiner*—Georgia Y Epps
*Assistant Examiner*—Jennifer Bennett
(74) *Attorney, Agent, or Firm*—Park, Vaughan & Fleming LLP

(57) ABSTRACT

A photosensor with customizable angular-response characteristics is presented. This photosensor includes a light-modifier located between the photosensor and a target area to be monitored by the photosensor, wherein the light-modifier provides a customizable angular response for light received at the photosensor from the target area.

19 Claims, 6 Drawing Sheets

MEASUREMENT SETUP DIAGRAM

FIG. 1

ANGULAR RESPONSE

PHOTOSENSOR WITH CUSTOMIZABLE ANGULAR-RESPONSE CHARACTERISTICS

RELATED APPLICATION

This application hereby claims priority under 35 U.S.C. §119 to U.S. Provisional Patent Application No. 60/900,080 filed 7 Feb. 2007, entitled "Dual Photo-Sensor Dimming Daylight Controls," by inventors Konstantinos Papamichael, Keith Graeber, Erik Page, and Michael Siminovitch.

BACKGROUND

1. Field of the Invention

The present invention relates to techniques for determining the intensity of light illuminating a target area.

2. Related Art

To reduce energy costs, it is desirable to reduce the amount of artificial light used to illuminate a target area within a space when the target area is sufficiently illuminated by a natural light source. Although photosensors can be used to determine whether a target area is sufficiently illuminated, existing photosensors often incorrectly determine the lighting level in the target area. For example, if a dark object is situated directly below the photosensor, the photosensor can incorrectly determine that the lighting level in the room is too low. As a result, an artificial light source may remain turned on when the artificial light source can instead be reduced in intensity or turned off.

SUMMARY

Some embodiments of the present invention provide a photosensor with customizable angular-response characteristics. The photosensor includes a light-modifier located between the photosensor and a target area to be monitored by the photosensor, wherein the light-modifier provides a customizable angular response for light received at the photosensor from the target area.

In some embodiments, the light-modifier includes one or more of: a baffle that defines a field-of-view for the photosensor; a light filter that filters light received by the photosensor; a light-diffuser which diffuses light received by the photosensor; a refractive layer which refracts light received by the photosensor; and a transmissive lens that operates on light received by the photosensor.

In some embodiments, the light-modifier facilitates measuring customized weights for light levels received from the target area, which involves one or more of the following: measuring a weighted average of light levels in the target area in a manner that that accounts for distance from the photosensor; measuring a weighted average of light levels in the target area in a manner that that accounts for angular sensitivity; measuring a weighted response for light levels in the target area in a manner that accounts for regions with high desired light-sensitivity, regions with low desired light-sensitivity, and/or regions with no desired light-sensitivity; adjusting angular sensitivity and field-of-view to asymmetrically measure light levels for the target area; and creating a uniform weighing technique that treats all areas with the target area evenly.

In some embodiments, the light-modifier is configured to be customized and/or changed.

In some embodiments, the light-modifier is configured to be customized to provide application-specific angular sensitivities.

In some embodiments, the light modifier includes a light filter which is manufactured and/or printed on a film as a pattern that selectively filters light to achieve a desired angular distribution of light-sensitivity for the target area.

In some embodiments, the light modifier includes a baffle which is shaped as a tube, wherein the shape, length, and/or opening of the tube can be adjusted to facilitate a specified angular acceptance of light from the target area.

In some embodiments, the interior of the baffle includes of one or more of: a light-absorbing material; and a light reflecting material.

In some embodiments, the light-reflecting material includes one or more of: a light-diffusing material; and a specular material.

In some embodiments, one or more surfaces of the baffle are colored and/or coated to prevent light reflection.

In some embodiments, the light modifier includes a lens or a diffuser with a variable shape, wherein the variable shape can be varied to achieve a specific customized angular sensitivity.

In some embodiments, the photosensor is: integrated into a light fixture; mounted on a ceiling; and/or mounted on a wall.

In some embodiments, the light-modifier provides a sharp cut-off angle for light received by the photosensor to eliminate measurement errors associated with bright objects located outside of a field of interest for the photosensor.

In some embodiments, the light-modifier provides a weighted average response which factors a surface brightness directly below the photosensor less strongly than a surface brightness further away from the photosensor.

In some embodiments, the customizable angular response of light-modifier can be preset at a factory and/or adjusted by a user.

Some embodiments of the present invention provide a lighting fixture which includes a light source and a photosensor. The light source is configured to produce a specified angular-light-distribution on a target area to be illuminated by the light source. The photosensor has customizable angular-response characteristics and includes a light-modifier located between the photosensor and the target area to be illuminated. This light-modifier is configured to provide a customizable angular response for light received at the photosensor from the target area.

In some embodiments, the light-modifier is configured to provide an angular response for light received at the photosensor from the target area which substantially matches the specified angular-light-distribution on the target area provided by the light source.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

Photosensor with Customizable Angular Response

Photosensors typically collect light from a range of angles that are incident to the photosensor. For daylight harvesting systems, the photosensor is typically located at a point in a room that is deemed representative of the lighting in the room as a whole. Often these sensors are "cosine corrected" so that the angle at which light is striking the sensor is weighted by a cosine function.

In some lighting applications, it is desirable to provide evenly distributed light to the space. In other lighting applications, it is desirable to provide light which is directed to a specified target area, while minimizing illumination to areas outside of the specified target area. Unfortunately, due to geometric effects and the characteristics of filters (and/or diffusers) used in existing photosensors, existing photosensors are not able to accurately measure lighting levels. Hence, some embodiments of the present invention provide a photosensor that has a weighted angular response that is customizable for a given application.

Figure 1:
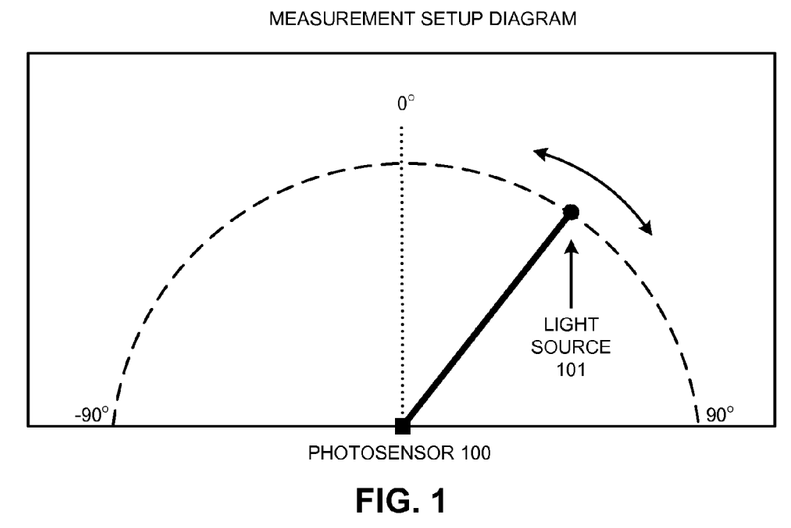
FIG. 1 illustrates a goniometer which is used to characterize the angular response of a photosensor in accordance with an embodiment of the present invention.

FIG. 1 presents illustrates goniometer which is used to characterize the angular response of photosensor 100 in accordance with an embodiment of the present invention. Light source 101 can be coupled to the goniometer and moved to specified angles about photosensor 100. In doing so, the angular response of photosensor 100 can be determined.

In some embodiments, a photosensor with an angular response that is less responsive at smaller angles of incidence and more responsive at higher angles is used.

Figure 2:
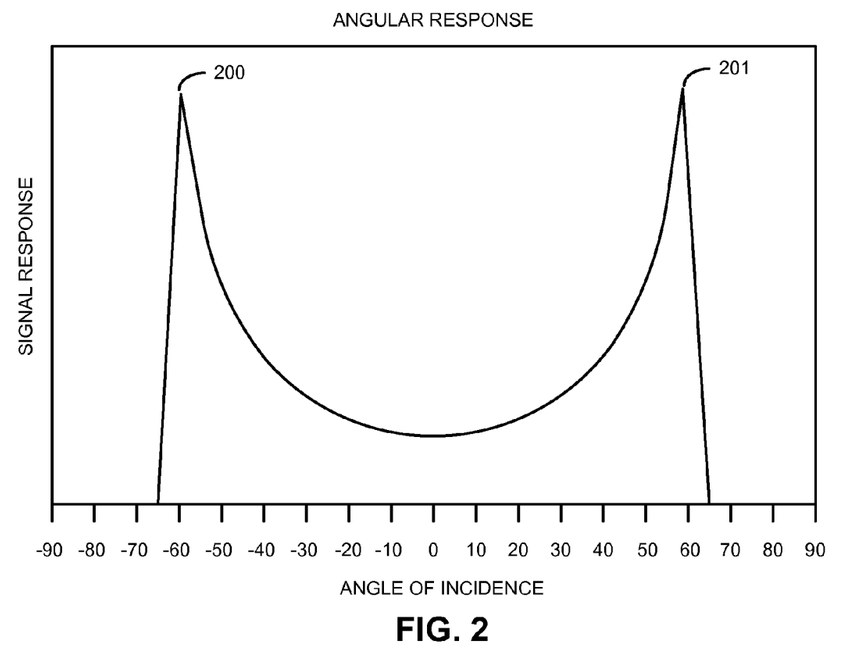
FIG. 2 presents a graph illustrating an exemplary angular response of a photosensor in accordance with an embodiment of the present invention.

In some embodiments, the photosensor can have a sharp cut-off at higher angles of incidence (e.g., to the left of peak 200 and to the right of peak 201 in FIG. 2). A sharp cut-off angle reduces errors associated with very bright objects (such as suspended light sources or bright light entering the space) outside of the intended field-of-view (e.g., the target area to be illuminated).

Figure 3:
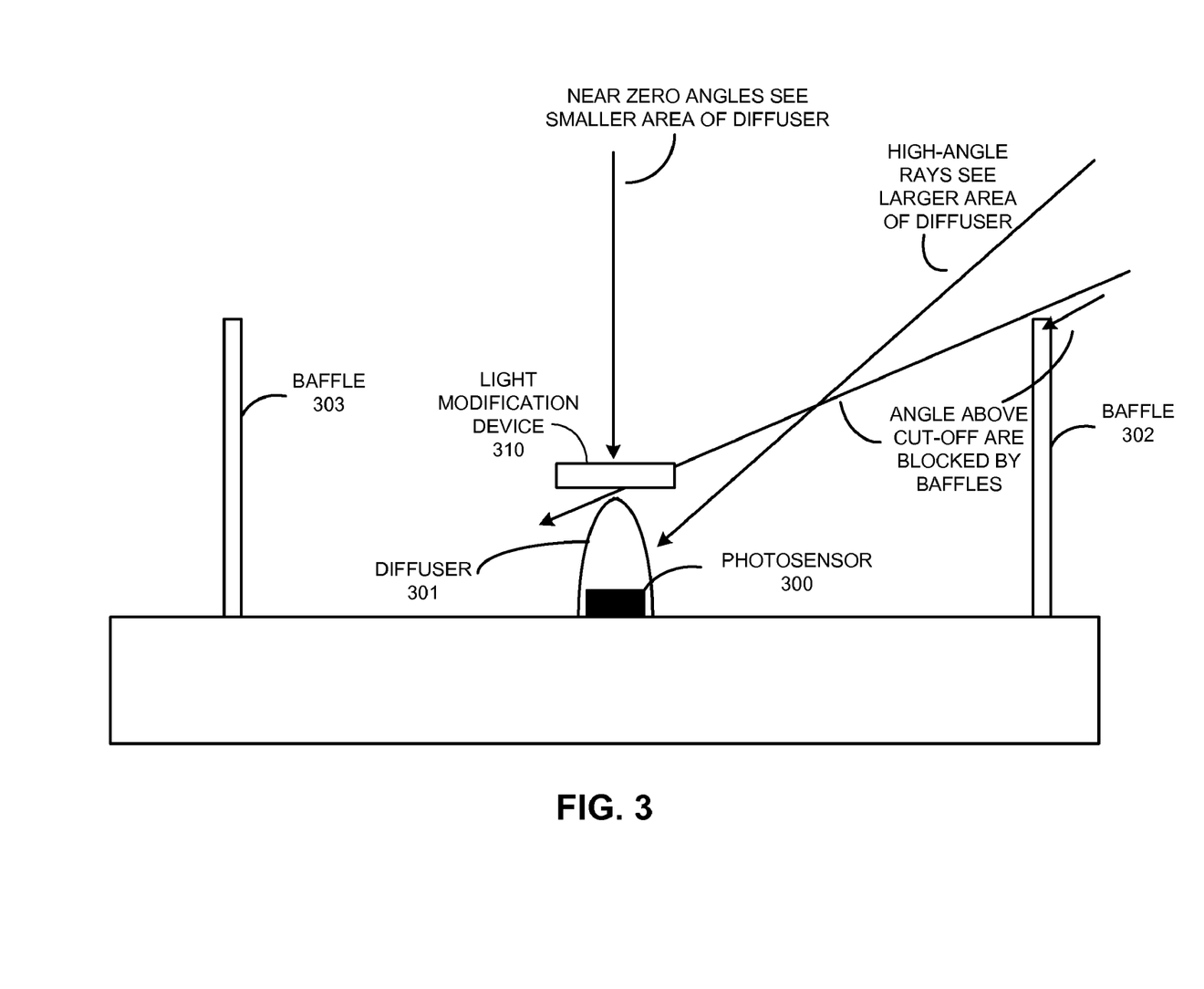
FIG. 3 presents a block diagram of an exemplary photosensor with customizable angular-response characteristics in accordance with an embodiment of the present invention.

FIG. 3 presents a block diagram of an exemplary photosensor 300 with customizable angular-response characteristics in accordance with an embodiment of the present invention. In some embodiments, diffuser 301 can be used to diffuse light incident on photosensor 300. As illustrated, high angle-of-incidence light rays see a larger surface area of diffuser 301 and near-zero angle-of-incidence light rays see a smaller surface area of diffuser 301. In some embodiments, baffles 302-303 can be used to cut-off light rays that exceed a specified angle-of-incidence with respect to photosensor 300.

Note that diffuser 301 and baffles 302-303 are only two examples of light-modification devices which can be used to customize the angular response of photosensor 300. In some embodiments, the light-modification device includes one or more of: a baffle that defines a field-of-view for the photosensor; a light filter that filters light received by the photosensor; a light-diffuser which diffuses light received by the photosensor; a refractive layer which refracts light received by the photosensor; and a transmissive lens that operates on light received by the photosensor. For example, a light modification device 310 in FIG. 3 (illustrated as a black box) can be a light filter, a refractive layer, a transmissive lens, or a combination of the above.

In some embodiments, the customized response includes a uniform weighting function which is applied to the measured light intensity within area of acceptance for the photosensor. A uniform weighting function treats areas within the area of interest evenly. Existing techniques weight the measured light intensity directly below the photosensor more strongly than surface brightness further away from the sensor. This weighting characteristic can lead to situations where the sensor signal is overly responsive to changes in the reflectance of surfaces directly underneath the photosensor. For example, if a white drawing is placed on a black table, the photosensor can mistakenly determine that there is more light than there actually is. Similarly, if a dark object is placed underneath the photosensor, the photosensor can mistakenly determine that there is less light than there actually is.

Hence, some embodiments of the present invention measure the average light intensity within an area of interest (e.g., a target area to be illuminated). For example, a photosensor can measure the average light intensity in the area illuminated by an artificial lighting system. For daylight harvesting applications, an artificial lighting system within the area of interest can be reduced proportionally to the natural light that falls within the area of interest.

In some embodiments, a filter is placed over the photosensor to measure the average light intensity within an area of interest. This filter can also negate the geometric effects of the specific application. For example, consider a photosensor placed in the middle of the ceiling of a space which is evenly illuminated. Due to geometric effects, the floor directly beneath the photosensor is closer to the photosensor than the floor near the corners of the room. Since light intensity decreases proportionally by the square of the distance to the source measured, the photosensor records higher light intensity readings directly beneath the photosensor than at the edges of the space even though the room may be evenly illuminated. The cosine weighting effect described above also adds add to this geometric effect by causing light intensity measurements directly beneath the sensor to be taken as 100% (i.e., cos(0)) while readings from off angles are scaled by the cosine of the angle.

In some embodiments, the filter is designed to selectively filter incident rays to mitigate the geometric effects of the room. For a lighting application which requires evenly-distributed light, the filter is configured to transmit more light from higher angles-of-incidence and to transmit less light at near-zero angles-of-incidence. In some embodiments, a domed filter that is thicker at near-zero angles and becomes progressively thinner at off-angles is used. In some embodiments, a filter that is darker at near-zero angles and becomes progressively lighter at off-angles is used.

In some embodiments, the "ideal transmissivity" of a filter can be expressed as a trigonometric function of the angle from normal and the sensor-to-floor distance. In some embodiments, variations in mounting height and room geometries are small enough so that a single customized filter can be used in a variety of applications. In other embodiments, a plurality of customized filters is used to facilitate various mounting heights and room conditions.

In some embodiments, the customized filters can be configured so that the field-of-view includes the floors and the walls of the space. In these embodiments, as the angle from normal increases, the field-of-view of the photosensor begins to move up the wall. Thus, the distance from the sensor to the light source decreases.

In some embodiments, a customizable photosensor is used as a control photosensor for a daylight harvesting lighting system. In some embodiments, a sharp cut-off angle makes the daylight harvesting lighting system less responsive to changes in lighting levels outside of the area of interest. Moreover, the uniform weighting function within the area of interest allows the daylight harvesting lighting system to more accurately and appropriately respond to changes in light levels within the area of interest.

In some embodiments, the light-modification device facilitates measuring customized weights for light levels received from the target area, which involves one or more of the following: (1) measuring a weighted average of light levels in the target area in a manner that that accounts for distance from the photosensor; (2) measuring a weighted average of light levels in the target area in a manner that that accounts for angular sensitivity; (3) measuring a weighted response for light levels in the target area in a manner that accounts for regions with high desired light-sensitivity, regions with low desired light-sensitivity, and/or regions with no desired light-sensitivity; (4) adjusting angular sensitivity and field-of-view to asymmetrically measure light levels for the target area; and (5) creating a uniform weighing technique that treats all areas with the target area evenly.

Figure 4:
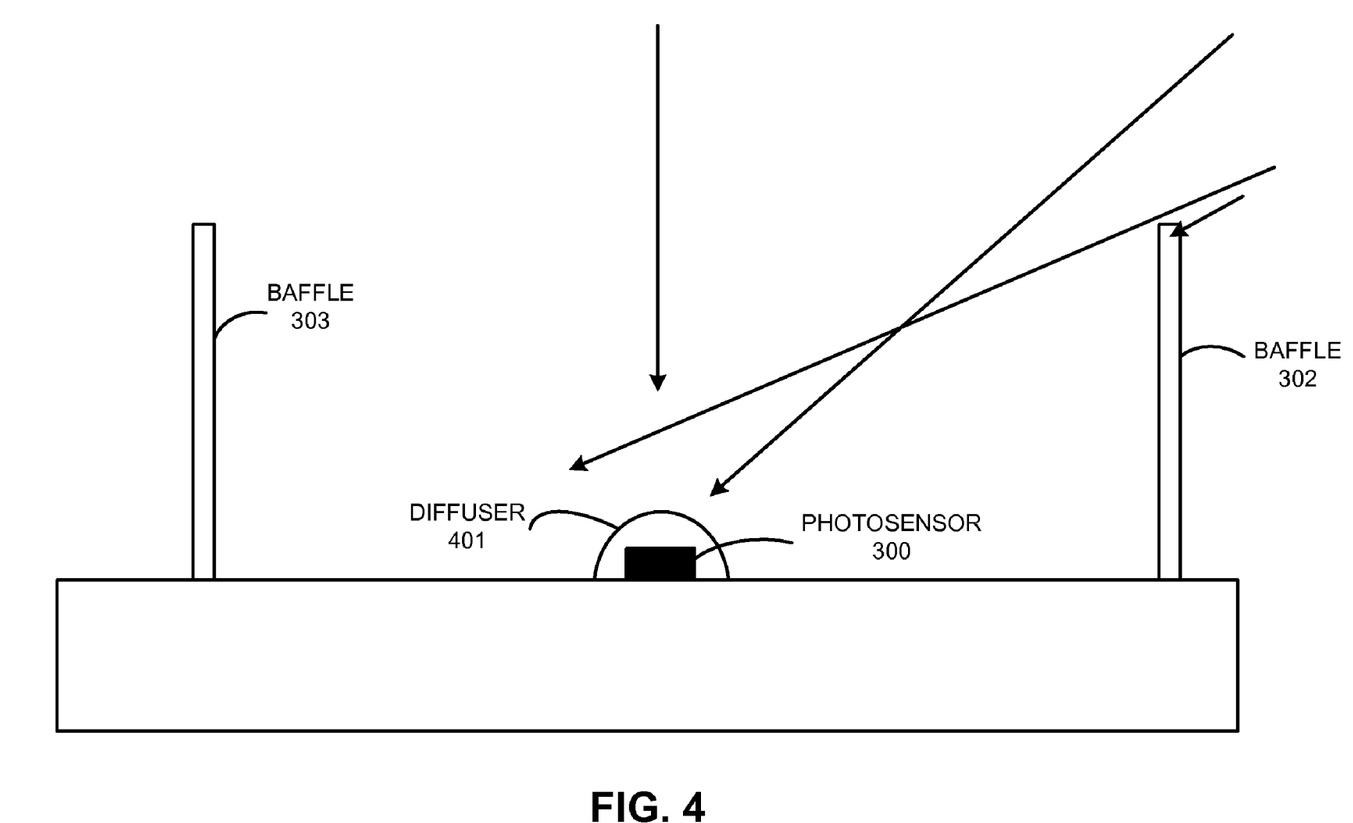
FIG. 4 presents a block diagram of another exemplary photosensor with customizable angular-response characteristics in accordance with an embodiment of the present invention.

In some embodiments, the light-modification device is configured to be customized to provide application-specific angular responses. For example, FIG. 4 illustrates a diffuser 401 which provides a different angular response than diffuser 301 in FIG. 3. For example, as compared to the spherical diffuser 401, the "stretched out" diffuser 301 causes near-zero (surface-normal) angle-of-incidence rays to see a smaller area of the diffuser than higher angle-of-incidence light rays. Baffles can also be used to block rays at angles above the desired cut-off angle.

Figure 5:
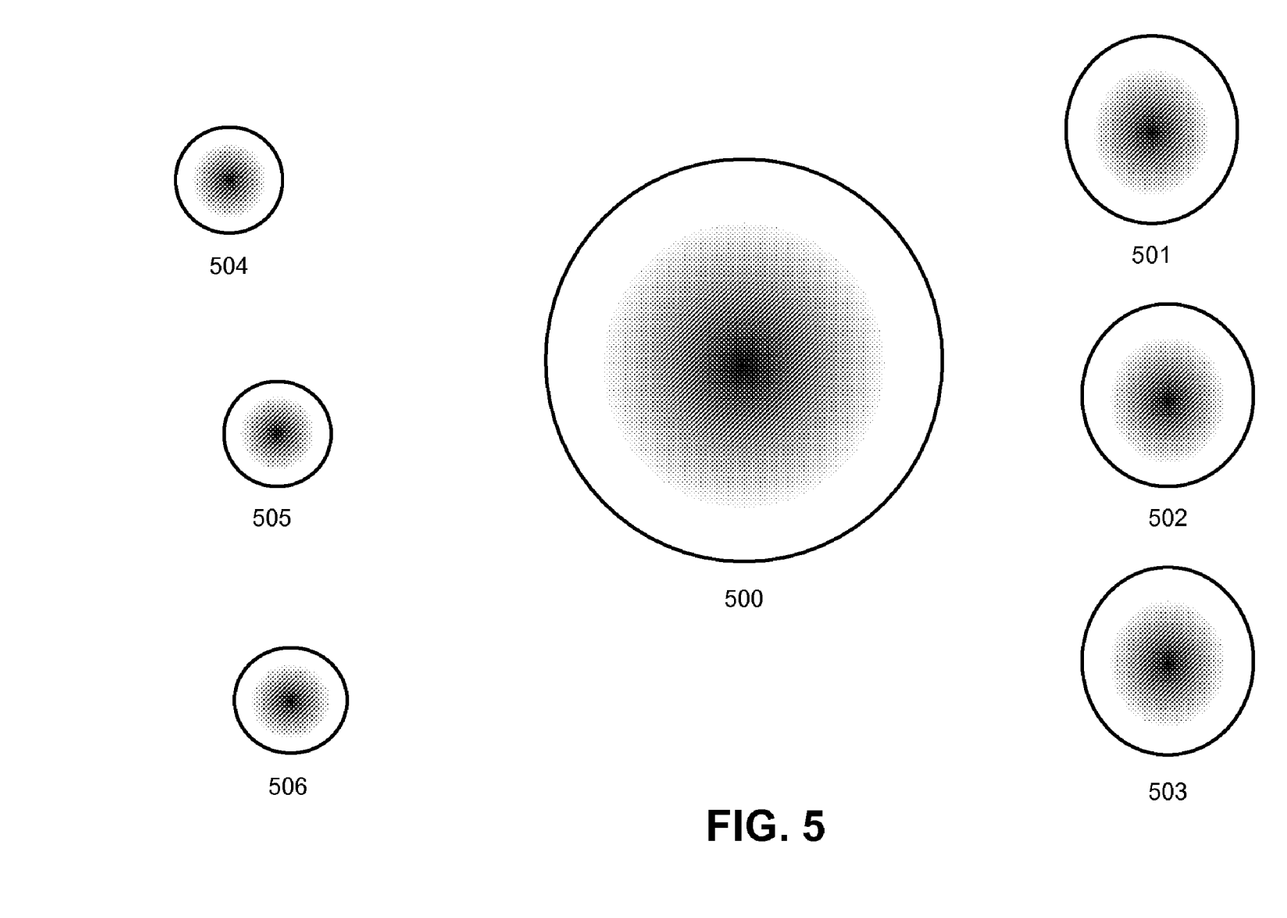
FIG. 5 illustrates exemplary patterns which can be applied to a diffuser and/or a filter in accordance with an embodiment of the present invention.

In some embodiments, the light-modification device includes a light filter which is manufactured and/or printed on a film as a pattern that selectively filters light to achieve a desired angular distribution of light-sensitivity for the target area. FIG. 5 illustrates exemplary patterns 500-506 which can be applied to diffusers and/or filters of different sizes in accordance with an embodiment of the present invention.

In some embodiments, the light-modification device is a baffle which is shaped as a tube. In these embodiments, the shape, length, and/or opening of the tube are adjusted to facilitate a specified angular acceptance of light from the target area.

In some embodiments, the interior of the baffle includes of one or more of: a light-absorbing material; and a light reflecting material. For example, the light-absorbing material can be colored black to absorb light. Furthermore, the light-absorbing material can be selected to absorb or transmit specified wavelengths of light. The light-absorbing material can be used to provide a sharp cutoff of light at specified angle-of-incidences.

In some embodiments, the light-reflecting material includes one or more of: a light-diffusing material; and a specular material. A light-diffusing material reflects light in all directions or in a specified set of angles. A specular material provides a mirror-like response, wherein the angle of reflection is substantially equal to the angle of incidence.

In some embodiments, one or more surfaces of the baffle are colored and/or coated to prevent light reflection.

In some embodiments, the light-modification device includes a lens or a diffuser with a variable shape, wherein the variable shape can be varied to achieve a specific customized angular sensitivity.

In some embodiments, the photosensor is: integrated into a light fixture; mounted on a ceiling; and/or mounted on a wall.

In some embodiments, the customizable angular response of light-modification device can be preset at a factory and/or adjusted by a user.

In some embodiments, the light-modification device is configured to be customized and/or changed.

Some embodiments of the present invention provide a lighting fixture which includes a light source and a photosensor with customizable angular-response characteristics. The light source is configured to produce a specified angular-light-distribution characteristic on a target area to be illuminated by the light source. The photosensor includes a light-modifier located between the photosensor and the target area to be illuminated, wherein the light-modifier is configured to provide a customizable angular response for light received at the photosensor from the target area.

In some embodiments, the light-modifier is configured to provide an angular response for light received at the photosensor from the target area which substantially matches the specified angular-light-distribution characteristic on the target area illuminated by the light source.

Figure 6A:
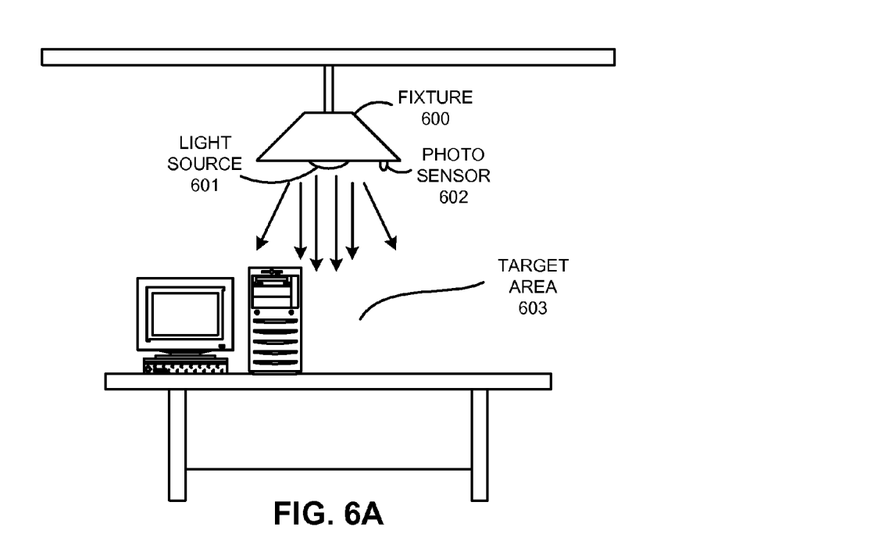
FIG. 6A presents a block diagram illustrating an exemplary lighting fixture in accordance with an embodiment of the present invention.
Figure 6B:
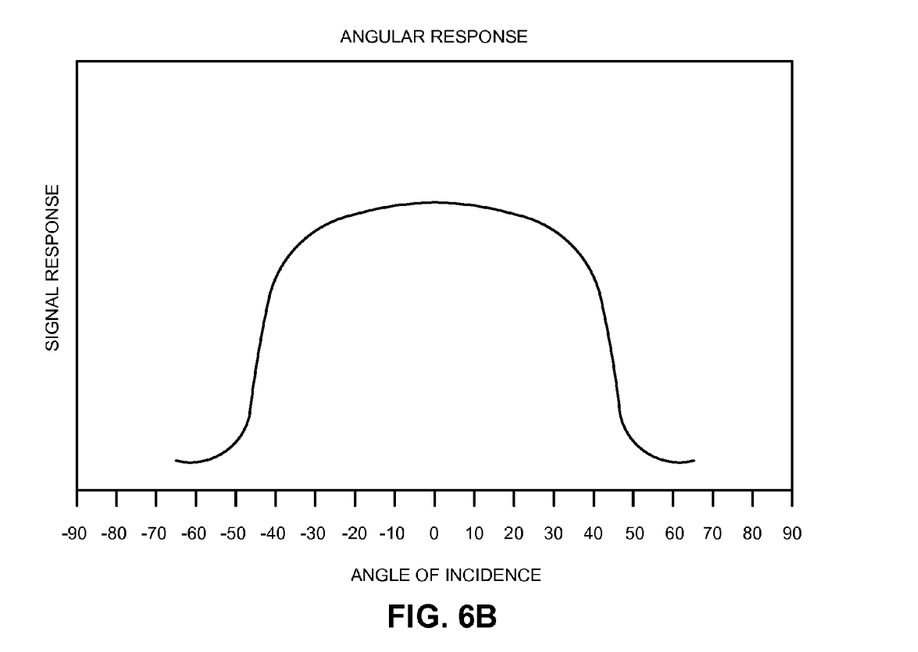
FIG. 6B presents a plot illustrating an exemplary angular response for the photosensor illustrated in FIG. 6A in accordance with an embodiment of the present invention.
Figure 7A:
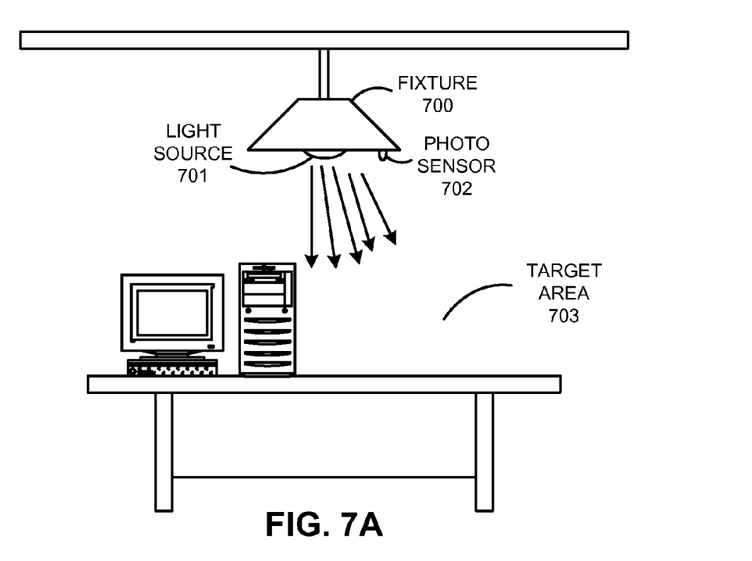
FIG. 7A presents a block diagram illustrating an exemplary lighting fixture in accordance with an embodiment of the present invention.
Figure 7B:
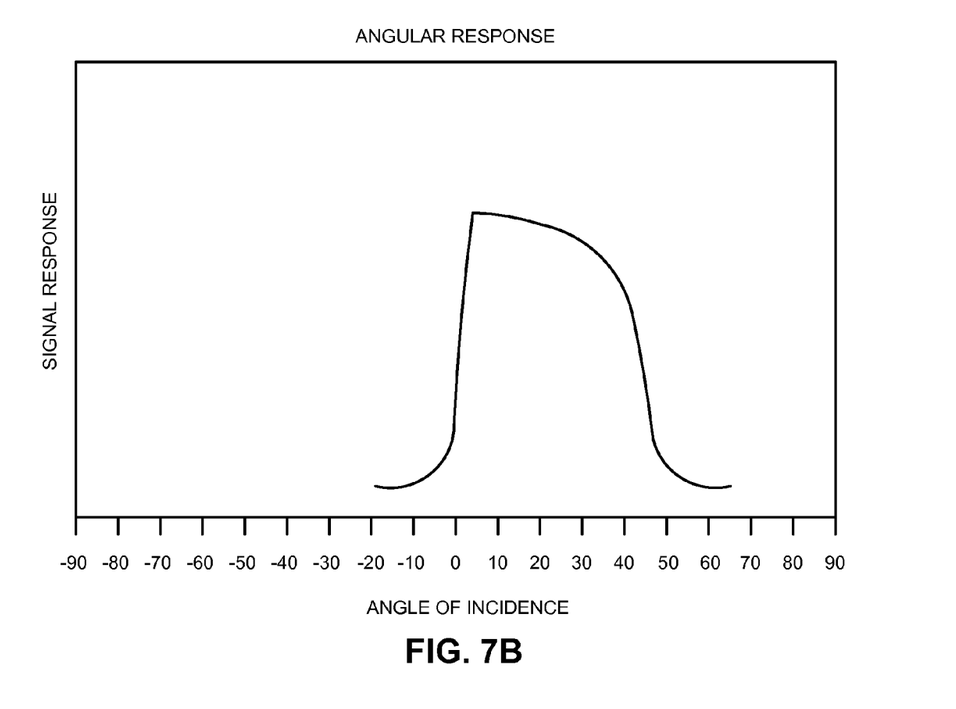
FIG. 7B presents a plot illustrating an exemplary angular response for the photosensor illustrated in FIG. 7A in accordance with an embodiment of the present invention.

FIGS. 6-7 illustrate these embodiments. FIG. 6A presents a block diagram illustrating an exemplary lighting fixture 600 in accordance with an embodiment of the present invention. Lighting fixture 600 includes one or more of light source 601 and photosensor 602. Light source 601 can be configured to illuminate a target area 603 with a specified angular-light-distribution characteristic. For example, light source 601 can be configured to illuminate areas directly below light source 601 with more light than areas at larger angles.

In some embodiments, photosensor 602 is configured to provide an angular response for light received at photosensor 602 that substantially matches the specified angular-light-distribution characteristic on the target area illuminated by light source 601. FIG. 6B presents a plot illustrating an exemplary angular response for photosensor 601 in accordance with an embodiment of the present invention. Since the specified angular-light-distribution characteristic of light source 601 is weighted more heavily at angles-of-incidence near normal (i.e., 0°), the angular response of photosensor 602 is customized to substantially match the specified angular-light-distribution characteristic of light source 601. Thus, even if the light at higher angles-of-incidence is at a specified level deemed to be sufficient for a given application, if the light directly below fixture 600 is below the specified level, the intensity of light source 601 is increased to compensate for the lower level of light directly below fixture 600.

FIG. 7A presents a block diagram illustrating an exemplary lighting fixture 700 in accordance with an embodiment of the present invention. Lighting fixture 700 includes one or more of light source 701 and photosensor 702. Light source 701 can be configured to illuminate a target area 703 with a specified angular-light-distribution characteristic. For example, light source 701 can be configured to illuminate areas to the right of fixture 700 with more light than areas to the left of fixture 700.

In some embodiments, photosensor 702 is configured to provide an angular response for light received at photosensor 702 that substantially matches the specified angular-light-distribution characteristic on the target area illuminated by light source 701. FIG. 7B presents a plot illustrating an exemplary angular response for photosensor 701 in accordance with an embodiment of the present invention. Since the specified angular-light-distribution characteristic of light source 701 is weighted more heavily to the right of light source 701 (i.e., positive angles) than to the left of light source 701 (i.e., negative angles), the angular response of photosensor 702 is customized to substantially match the specified angular-light-distribution characteristic of light source 701. Thus, even if the light at negative angles-of-incidences are at a specified level deemed to be sufficient for a given application, if the light to the right of fixture 700 is below the specified level, the intensity of light source 701 is increased to compensate for the lower level of light to the right of fixture 700.

Note that embodiments applied to filters can also be applied to diffusers and embodiments applied to diffusers can be applied to filters.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A photosensor with customizable angular-response characteristics, comprising:
   the photosensor; and
   a light-modifier located between the photosensor and a target area to be monitored by the photosensor;
   wherein the light-modifier provides a customizable angular response for light received at the photosensor from the target area, which involves providing an angular response for light received at the photosensor from the target area which substantially matches a specified angular-light-distribution characteristic on the target area illuminated by a light source.

2. The photosensor of claim 1, wherein the light-modifier includes one or more of:
   a baffle that defines a field-of-view for the photosensor;
   a light filter that filters light received by the photosensor;
   a light-diffuser which diffuses light received by the photosensor;
   a refractive layer which refracts light received by the photosensor; and
   a transmissive lens that operates on light received by the photosensor.

3. The photosensor of claim 1, wherein the light-modifier facilitates measuring customized weights for light levels received from the target area, which involves one or more of the following:
   measuring a weighted average of light levels in the target area in a manner that that accounts for distance from the photosensor;
   measuring a weighted average of light levels in the target area in a manner that that accounts for angular sensitivity;
   measuring a weighted response for light levels in the target area in a manner that accounts for regions with high desired light-sensitivity, regions with low desired light-sensitivity, and/or regions with no desired light-sensitivity;
   adjusting angular sensitivity and field-of-view to asymmetrically measure light levels for the target area; and
   creating a uniform weighing technique that treats all areas with the target area evenly.

4. The photosensor of claim 1, wherein the light-modifier is configured to be customized and/or changed.

5. The photosensor of claim 4, wherein the light-modifier is configured to be customized to provide application-specific angular sensitivities.

6. The photosensor of claim 1, wherein the light modifier includes a light filter which is manufactured and/or printed on a film as a pattern that selectively filters light to achieve a desired angular distribution of light-sensitivity for the target area.

7. The photosensor of claim 1,
   wherein the light modifier includes a baffle which is shaped as a tube; and
   wherein the shape, length, and/or opening of the tube are adjusted to facilitate a specified angular acceptance of light from the target area.

8. The photosensor of claim 7, wherein the interior of the baffle includes of one or more of:
   a light-absorbing material; and
   a light-reflecting material.

9. The photosensor of claim 8, wherein the light-reflecting material includes one or more of:
   a light-diffusing material; and
   a specular material.

10. The photosensor of claim 7, wherein one or more surfaces of the baffle are colored and/or coated to prevent light reflection.

11. The photosensor of claim 1, wherein the light modifier includes a lens or a diffuser with a configurable shape, wherein the configurable shape can be configured to achieve a specific customized angular sensitivity.

12. The photosensor of claim 1, wherein the photosensor is:
   integrated into a light fixture;
   mounted on a ceiling; and/or
   mounted on a wall.

13. The photosensor of claim 1, wherein the light-modifier provides a sharp cut-off angle for light received by the photosensor to eliminate measurement errors associated with bright objects located outside of a field of interest for the photosensor.

14. The photosensor of claim 1, wherein the light-modifier provides a weighted average response which factors a surface brightness directly below the photosensor less strongly than a surface brightness further away from the photosensor.

15. The photosensor of claim 1, wherein the customizable angular response of light-modifier can be preset at a factory and/or adjusted by a user.

16. A lighting fixture, comprising:
   a light source which produces a specified angular-light-distribution on a target area to be illuminated by the light source; and
   a photosensor with customizable angular-response characteristics, wherein the photosensor includes a light-modifier located between the photosensor and the target area to be illuminated; and
   wherein the light-modifier is configured to provide a customizable angular response for light received at the photosensor from the target area, which involves providing an angular response for light received at the photosensor from the target area which substantially matches the specified angular-light-distribution characteristic on the target area illuminated by the light source.

17. The lighting fixture of claim 16, wherein the light-modifier includes one or more of:
- a baffle that defines a field-of view for the photosensor;
- a light filter that filters light received by the photosensor;
- a light-diffuser which diffuses light received by the photosensor;
- a refractive layer which refracts light received by the photosensor; and
- a transmissive lens that operates on light received by the photosensor.

18. The lighting fixture of claim 16, wherein the light-modifier facilitates measuring customized weights for light levels received from the target area, which involves one or more of the following:
- measuring a weighted average of light levels in the target area in a manner that that accounts for distance from the photosensor;
- measuring a weighted average of light levels in the target area in a manner that that accounts for angular sensitivity;
- measuring a weighted response for light levels in the target area in a manner that accounts for regions with high desired light-sensitivity, regions with low desired light-sensitivity, and/or regions with no desired light-sensitivity;
- adjusting angular sensitivity and field-of-view to asymmetrically measure light levels for the target area; and
- creating a uniform weighing technique that treats all areas with the target area evenly.

19. The lighting fixture of claim 16, wherein the light-modifier is configured to be customized and/or changed.

* * * * *